(12) United States Patent
Ali et al.

(10) Patent No.: US 7,162,721 B2
(45) Date of Patent: Jan. 9, 2007

(54) APPLICATION-INDEPENDENT API FOR DISTRIBUTED COMPONENT COLLABORATION

(75) Inventors: Syed M. Ali, Sunnyvale, CA (US); Robert N. Goldberg, Emerald Hills, CA (US); Yury Kamen, Foster City, CA (US); Bruce K. Daniels, Capitola, CA (US); Peter A. Yared, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 615 days.

(21) Appl. No.: 10/004,971

(22) Filed: Dec. 3, 2001

(65) Prior Publication Data

US 2003/0105644 A1   Jun. 5, 2003

(51) Int. Cl.
*G06F 13/00* (2006.01)
(52) U.S. Cl. ..................................... 719/310
(58) Field of Classification Search ............... 719/310, 719/330
See application file for complete search history.

(56) References Cited

U.S. PATENT DOCUMENTS 5,913,030 A * 6/1999 Lotspiech et al. .......... 709/203
6,347,342 B1 * 2/2002 Marcos et al. ............. 719/315
6,446,137 B1 * 9/2002 Vasudevan et al. ......... 719/330
6,496,865 B1 * 12/2002 Sumsion et al. ............ 709/229
6,751,798 B1 * 6/2004 Schofield ................... 719/330
6,760,747 B1 * 7/2004 Allard et al. ............... 709/203
6,947,965 B1 * 9/2005 Glass ........................ 709/203

OTHER PUBLICATIONS

M. Jeff Wilson; "*Get Smart With Proxies and RMI*;" Article; Nov. 2000; pp. 1-17; JavaWorld; javaworld.com.
"*Chapter 23—Smart Proxies*;" Manual; Nov. 2000: pp. 1-9; Orbix Programmer's Guide Java Edition; IONA Technologies PLC; iona.com.

* cited by examiner

*Primary Examiner*—William Thomson
*Assistant Examiner*—LeChi Truong
(74) *Attorney, Agent, or Firm*—Osha Liang LLP

(57) ABSTRACT

A method for a system having distributed collaborating components includes restricting direct interaction between distributed collaborating components by introducing an application-independent interface between distributed collaborating components and invoking a service from the application-independent interface in order to enable interaction between distributed collaborating components.

19 Claims, 3 Drawing Sheets

APPLICATION-INDEPENDENT API FOR DISTRIBUTED COMPONENT COLLABORATION

BACKGROUND OF INVENTION

1. Field of the Invention

The invention relates generally to object-oriented technology. More specifically, the invention relates to collaboration between components in a distributed application.

2. Background Art

Modern enterprise applications are typically implemented as multi-tier systems. Multi-tier systems serve the end-user through a chain of client/server pairs. Enterprise systems are typically implemented in a number of components, where each component may contain multiple object instances at runtime. Each component interacts with other system components at runtime to provide a set of functions to the system.

FIG. 1 shows an example of a four-tiered system that includes a user interface tier 2, a web server tier 4, an application server tier 6, and a data tier 8. The user interface tier 2 is the layer of interaction and typically includes a form-like graphical user interface (GUI) displayed by a display component, typically a web browser 10. The web server tier 4 includes web components 12 hosted on a web server 14. The web components 12 generate the content displayed by the web browser 10. The application server tier 6 includes application components 16 hosted on an application server 18. The application components 16 model the business rules, typically through interaction with application data. The data tier 8 includes a persistent data store, typically a database management system (DBMS) 20 and a database 22.

The web browser 10 and the web server 14 form a client/server pair. The web server 14 and the application server 18 form another client/server pair. The application server 18 and DBMS 20 form yet another client/server pair. A web component 12 and an application component 16 are in a client/server relationship when the web component 12 (client) uses services of the application component 16 (server) to provide functions to the system. In order for the client and server to collaborate, there must be a contract, or interface definition, between the client and server that specifies the server methods that can be invoked by the client. When the client and server are in different address spaces, the client uses some form of remote procedure call (RPC) to invoke the server methods. Typically, this involves the client calling into a local stub, which forwards the call to the server.

The granularity of an object is a measure of the size of the object and the number of the interactions the object makes with other objects. Large-grained objects have few interactions with other objects, while fine-grained objects have many interactions with other objects. Object-oriented, client/server programmers often develop server programs that embed large-grained and fine-grained object models. One of the consequences of fine-grained behavior is that the client program makes excessive remote method calls to the fine-grained object in the server program in order to access and update the attributes of the object. Remote method calls are expensive in terms of computer processor usage, input/output access, and overall time usage. For each remote method call, data may have to be marshaled and later un-marshaled, authentication may have to be performed before the client can use services provided by the server, packets may need to be routed through switches, and so forth. Thus, numerous remote method calls can have a huge impact on the performance and scalability of the application. For optimal distribution performance, the number of client/server roundtrips must be minimized.

The process of developing and deploying components in a distributed environment, such as that illustrated in FIG. 1, is often iterative and incremental. It is not unusual to alter the different components of the distributed system a few times before the components reach a stable state. These modifications may include changing the interface and behavior of the objects in the components. Also, due to lack of distributed debuggers, it is common to inject code into the distributed application for the purpose of debugging the application.

Difficulties arise when modifications are made to the distributed application while the application is running. For example, if the interface or behavior of a remote (server) object is changed, all the parts of the distributed application have to be halted in order to re-deploy the modified remote object and its respective stubs on all the clients. Re-deployment resets the running state of the distributed application, requiring the application to be restarted. This makes deployment of distributed components extremely dependent on each other. Also, every time a new debug statement is injected into the distributed system, the entire application has to be re-deployed, making the edit, compile, and deploy cycle tedious.

At this point, there is no known work that allows distributed applications to run seamlessly after the interface between the components of the application has been modified. Most object request brokers (ORBs) and application servers support hot deployment, which allows modifications made to distributed applications to take effect without bringing the servers down. However, these deployment mechanisms typically reset the running state of the applications, resulting in the client stubs going "stale."

SUMMARY OF INVENTION

In one aspect, the invention relates to a method for a system having distributed collaborating components. The method comprises restricting direct interaction between distributed collaborating components by introducing an application-independent interface between distributed collaborating components and invoking a service from the application-independent interface in order to enable interaction between distributing collaborating components.

In one aspect, the invention relates to a method for a distributed system having a client and a server. The collaboration method comprises interposing a service layer between the client and the server. The service layer has a capability to interpret a specification from the client at runtime in order to enable interaction between the client and the server. The collaboration method further includes routing correspondence between the client and server through the service layer.

In one aspect, the invention relates to a computer-readable medium having recorded thereon instructions executable by a processor. The instructions are for receiving a specification from a client component and interpreting the specification in order to enable interaction between the client component and the server component.

In one aspect, the invention relates to a distributed system which comprises a client component, a server component having at least one object at runtime, and a service layer between the client and the server component. The service layer has a capability to interpret a specification of usage of the object at runtime.

In one aspect, the invention relates to a distributed system which comprises a service means for providing application-independent services and for interpreting a usage specification and a logic execution specification. The distributed system further includes a client component that sends the usage specification and the logic execution specification to the service means and a server component that interacts with the service means in order to provide services to the client component.

In one aspect, the invention relates to an apparatus for distributed collaborating components. The apparatus comprises a means for restricting direct interaction between distributed collaborating components by introducing an application-independent interface between distributed collaborating components, and means for invoking a service from the application-independent interface in order to enable interaction between distributing collaborating components.

Other features of the invention will be apparent from the following description and the appended claims.

DETAILED DESCRIPTION

A generic service layer consistent with the principles of the invention enables a distributed application to run seamlessly even after the interface between the components of the application has been modified. The generic service layer has a capability to interpret a usage specification and a logic execution specification at runtime. A usage specification specifies data (object attributes) required by a client, and a logic execution specification specifies services (object methods) required by a client. The invention separates usage specification and logic execution specification from implementation of the components and restricts all interactions between the components by introducing the generic service layer between them. At runtime, all correspondences between the client and server are routed through the generic service layer, which interprets the client's usage and logic execution specifications. Since all interactions are in the form of usage and logic execution specifications, all the round trips of fetching/posting data to the server can be done together in one round trip, instead of numerous round trips.

The following is a detailed description of specific embodiments of the invention. In the following detailed description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. For example, the various mechanisms for making calls to remote objects are not discussed. It will be clear to those skilled in the art that when objects run in separate address spaces some form of remote procedure call is needed to invoke the methods of the remote object.

Figure 1:
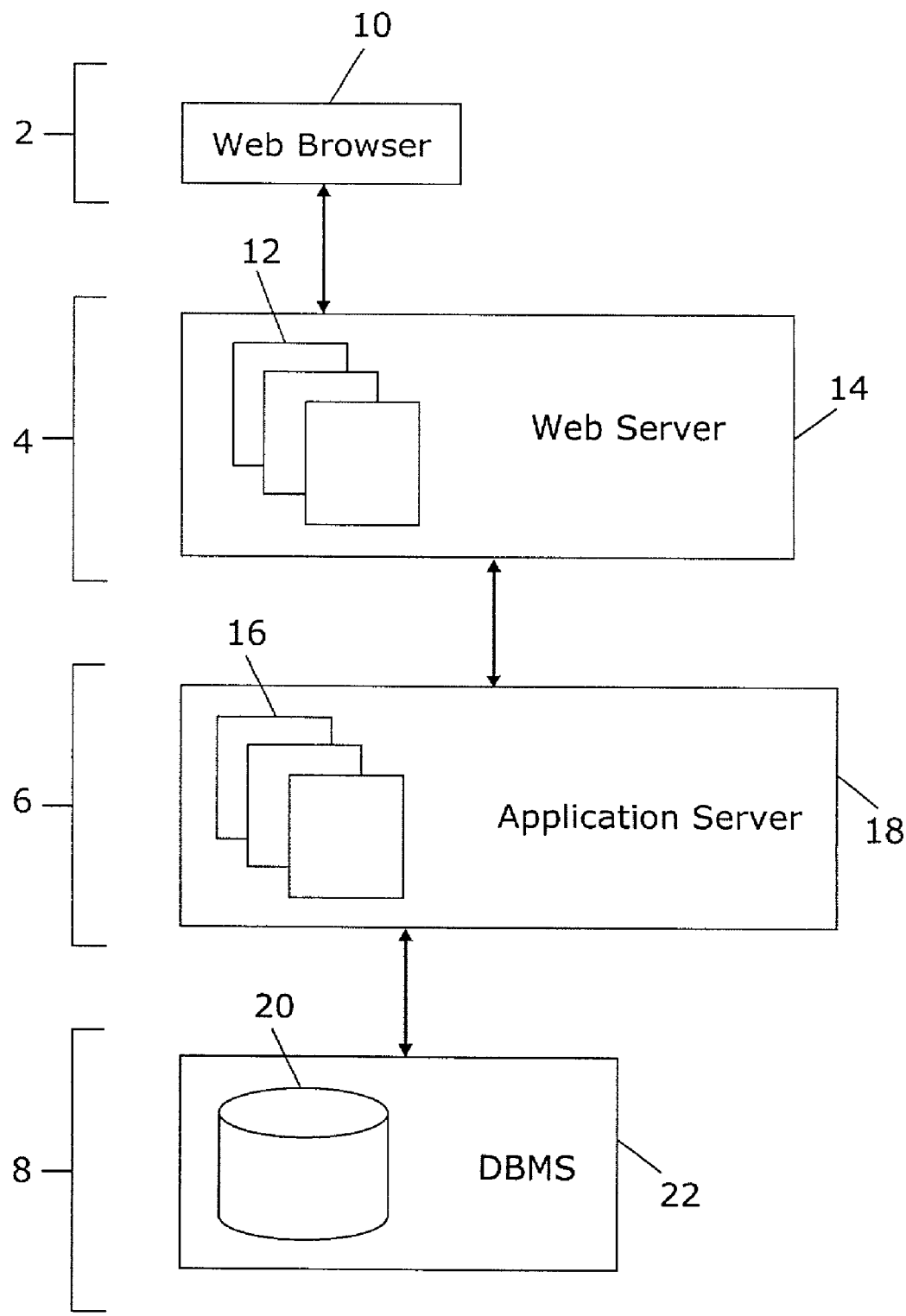
FIG. 1 shows an example of a multi-tiered system.
Figure 2:
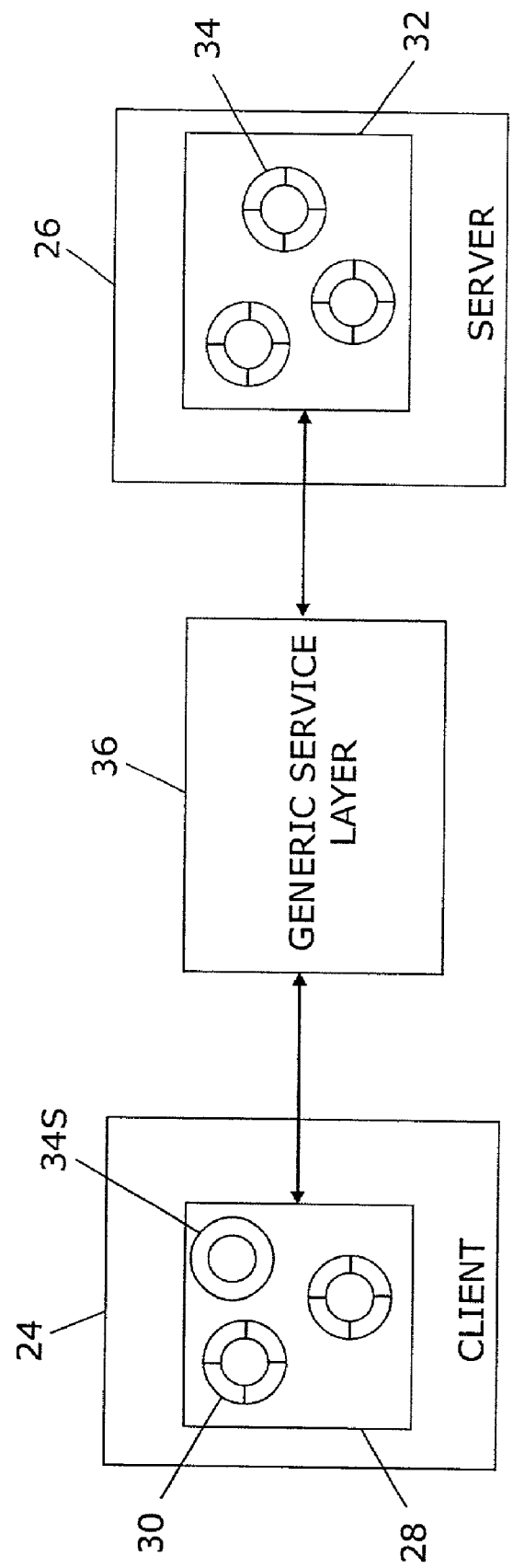
FIG. 2 shows a distributed system incorporating an embodiment of the invention.

FIG. 2 shows a distributed system that includes a client 24 and a server 26. The distributed system may include several other client/server pairs. However, it is not necessary to show several client/server pairs to illustrate the principles of the invention. A client component 28 is deployed on the client 24. The client component 28 may include one or more client objects 30. A server component 32 is deployed on the server 26. The server component 32 may include one or more server objects 34. As an example, the client 24 may be a web server or other computer system, and the server 26 may be an application server or other computer system.

In accordance with an embodiment of the invention, a generic service layer 36 is interposed between the client component 28 and the server component 32 to prevent direct interaction between the components 28, 32. The service layer 36 is called "generic" because it provides application-independent services, i.e., the generic service layer 36 provides services that can be reused by any application without modification. At runtime, the generic service layer 36 interprets usage and logic execution specifications, which are application-dependent, in order to enable collaboration between the client component 28 and the server component 32. Examples of application-independent services provided by the generic service layer 36 include fetching data from an object, updating an object with given data, and executing logic.

In one embodiment, the generic service layer 36 fetches a list of objects and object attributes from the server component 32 based on a usage specification from the client component 28. An example of a usage specification for an employee object e is shown below, where the terms "RW" and "R" stand for "Readable/Writeable" and "Readable," respectively.

```
e          "Employee Information": RW {
   empNo              "Employee Number": R,
   lastName           "Last Name",
   extension          "Extension",
   hireDate           "Hire Date",
   dob                "Date of Birth",
   manager            "Manager": R {
       empNo              "Manager Employee No",
   },
   department         "Department": R {
       name               "Department Name",
   },
   building           "Building": R {
       buildingName       "Building Name",
   }
}
```

In one embodiment, the generic service layer 36 interprets logic execution specification from the client component 28. The logic execution specification includes a sequence of operations to be performed in the server component 32. As an example, the logic execution specification may include instructions for creating a server object or for invoking certain business method calls on a server object. The following is an example of a logic execution specification for creating a new employee:

themanager=Managers.getSelectedOne( );
theDepartment=Departments.getSelectedOne( );
theBuilding=Buildings.getSelectedOne( );
newEmployeePK=factory(NameTool.Employee).assign-NextPK( );
newEmployee=factory(NameTool.Employee).create(newEmployeePK);
newEmployee.setManger(theManager);
newEmployee.setDepartment(theDepartment);
newEmployee.setBuilding(theBuilding);

return new EmployeeDetail(newEmployee);

As shown in the usage specification above, the employee object e includes references to a manager object, department object, and building object. The logic execution specification includes instructions for locating selected manager, department, and building objects, creating a new Employee object and assigning a manager, a department, and a building to the newly created Employee object.

In operation, the client component 28 invokes services from the generic service layer 36 in order to interact with the server component 32. To fetch data from a server object 34, the client component 28 invokes a service from the generic service layer 36 that takes a usage specification as an argument. The usage specification would include the attributes of the server object 34 needed by the client component 28. The generic service layer 36 finds the server object 34, interprets the usage specification to determine the object attributes to fetch, fetches the requested attributes from the server object 34, and returns the data to the client component 28. The data is cached in a proxy 34S for the server object 34 and locally accessed by the client component 28. The client component 28 can modify the data cached in the proxy 34S as needed.

To update the data in the server object 34 with the data in the proxy 34S, the client component 28 invokes a service from the generic service layer 36 that takes a usage specification and modified data in the proxy 34S as arguments. The usage specification would include the attribute of the server object 34 to be updated with the modified data from the proxy 34S. The generic service layer 36 finds the server object 34 again and updates the server object 34 using the modified data from the proxy 34S.

If there is a need to execute any business logic, the client component 28 may also invoke a service of the generic service layer 36 that takes a logic execution specification as argument. The generic service layer 36 executes the logic and returns the results to the client component 28. The logic execution specification can be modified as necessary at runtime. Thus, if the interface of a server object changes for any reason, the logic can be modified to reflect this change. The application can continue to run without having to reset its running state because the logic execution specification is interpreted at runtime by the generic service layer 36. Debugging code can also be injected into the logic execution specification and the debugging code can be executed without having to first halt the application and restart the application.

The generic service layer 36 can be implemented in a variety of ways depending on the underlying technology of the distributed system. For example, in a Java™ 2 Platform, Enterprise Edition (J2EE™) architecture, the generic service layer 36 may be implemented as an Enterprise JavaBean™ (EJB™) component. For example, the generic service layer 36 may be implemented as a session bean. A session bean is created by the client and usually exists for the duration of the client/server session. The session bean performs operations on behalf of the client. A session bean can either be stateless or stateful, i.e., maintain conversational state across methods and transactions. The client interacts with the bean through two wrapper interfaces: home interface and remote interface. The home interface is used for lifecycle operations, i.e., creating, destroying, or finding instances of the session bean. The remote interface provides access to methods of the session bean. Complete information regarding the J2EE™ architecture and EJB is available from Sun Microsystems, both in print and via the Internet at java.sun.com.

Figure 3:
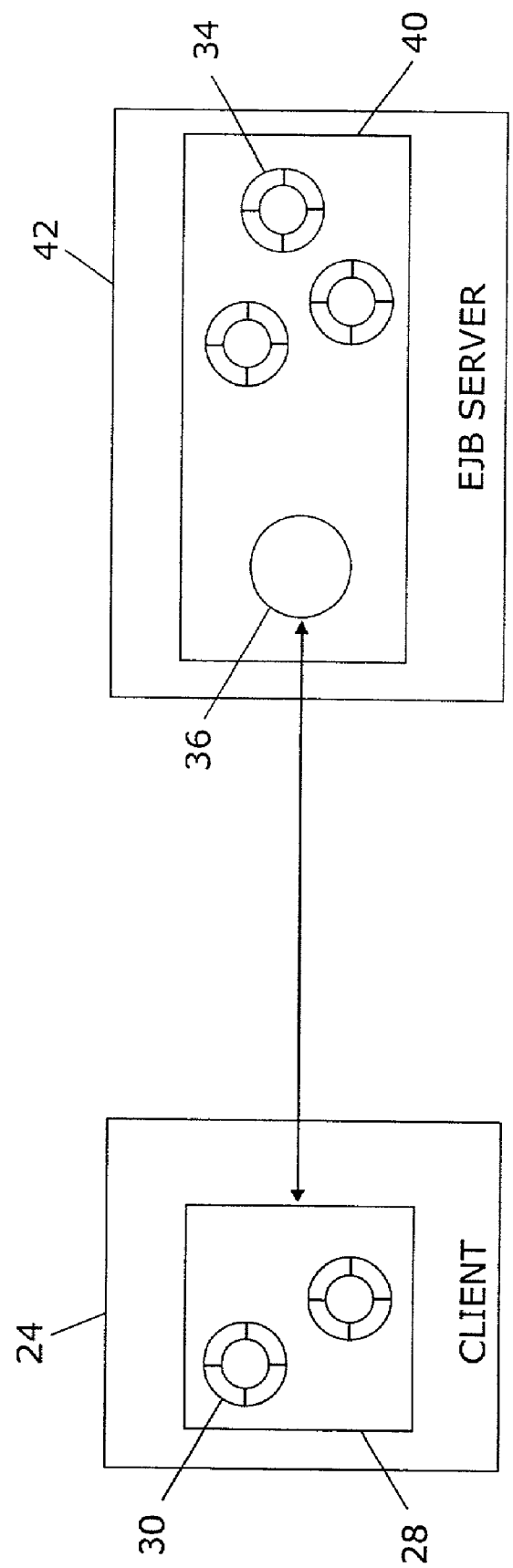
FIG. 3 shows the generic service layer of FIG. 2 implemented as a session bean.

FIG. 3 shows the generic service layer 36 implemented as a session bean. The session bean 36 is hosted inside an EJB container 40 on an EJB server 42. The EJB server 42 is basically an application server that provides the environment necessary for execution of EJB applications. The server objects 34 are also hosted inside the EJB container 40. This assumes that the server objects 34 are EJB components. If the server objects 34 are not EJB components, the session bean 36 may interact with the server objects 34 through an appropriate wrapper interface. The client side of the distributed system remains as described in FIG. 2.

In one embodiment, the remote interface of the session bean provides access to the following services: getObjects, setObjects, invokeRemoteMethod, and makeTransition.

The getObjects method takes a server identity of the root of an object graph and a vector of usage strings defining what is to be fetched from the server as parameters. The getObjects method locates the object graph using the server identity and returns an object graph to the client that contains the attributes specified in the usage strings. There are various mechanisms for packaging object graphs for transport, such Java™ serialization and CORBA ("Common Object Request Broker Architecture").

The setObjects method takes an object graph to be stored on the server and a vector of usage strings defining what the client has changed as parameters. The setObjects method updates the server objects having the attributes specified in the vector of usage strings using the data stored in the object graph.

The invokeRemoteMethod method takes a remote method, a client-side object graph needed to execute the remote method, a vector of objects to update on the client after executing the remote method, and a vector of usage strings defining what to update on the client as parameters. The invokeRemoteMethod method updates the client-side object graph using the server data, invokes the remote method on the server, packages the result as well as the objects to update on the client, and sends the package to the client.

The makeTransition method stores an object graph and a vector of usage into a database. The vector of usage contains strings defining what has changed within the object graph. Further, the makeTransition method retrieves data using an array of usage information for all possible destination states that may be transitioned to. Finally, the makeTransition method takes as a parameter business logic to be executed e.g., Java™ script or a script written in another language, which is to be run on the server as part of the transition. The makeTransition method facilitates transition from one state to another by retrieving and storing object graphs based on the usage specification. In addition, the makeTransition method executes business logic on the server to determine the destination state of the transition using the array of usage information.

The invention provides one or more advantages. Separation of usage specification and logic execution specification makes development and debugging process of distributed components easier. Since all client/server interactions are in the form of usage and logic specifications, all the round trips of fetching/posting data to the server and logic execution can be done together in one trip, instead of multiple trips. Different distributed components can be developed without the knowledge of their cooperation with other components. Because the distributed components do not interact directly, it is possible to change any part of the distributed application without affecting the remaining system. Because of the interpreted nature of the execution of logic, it is possible to modify logic at runtime. Modification of logic execution at runtime also makes the debugging of distributed application easier. That is, debugging code can be injected into the logic execution specification and executed without having to re-deploy the application.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for a system having distributed collaborating components, comprising:
   restricting direct interaction between a first distributed collaborating component and a second distributed collaborating component by introducing an application-independent interface between the first and second distributed collaborating components;
   invoking a service from the application-independent interface to enable interaction between the first and second distributed collaborating components; and
   sending a usage specification as an argument to the application-independent interface, wherein the usage specification comprises a server object and a plurality of attributes associated with the server object that are requested by the first distributed collaborating component from the second distributed collaborating component,
   wherein the application-independent interface is configured to:
      interpret the usage specification to determine the plurality of attributes to fetch from the second distributed collaborating component;
      obtain the plurality of attributes from the second distributed collaborating component; and
      provide the first distributed collaborating component with the plurality of attributes.

2. The method of claim 1, wherein the application-independent interface has a capability to interpret the usage specification at runtime.

3. A computer-implemented method for a system having distributed collaborating components, comprising:
   restricting direct interaction between a first distributed collaborating component and a second distributed collaborating component by introducing an application-independent interface between the first and second distributed collaborating components; and
   invoking a service from the application-independent interface to enable interaction between the first and second distributed collaborating components; and
   sending a usage specification as an argument to the application-independent interface, wherein the usage specification comprises a server object and a plurality of attributes associated with the server object that are requested by the first distributed collaborating component from the second distributed collaborating component,
   wherein the application-independent interface is configured to:
      interpret the usage specification to determine the plurality of attributes to fetch from the second distributed collaborating component;
      obtain the plurality of attributes from the second distributed collaborating component; and
      provide the first distributed collaborating component with the plurality of attributes.

4. The method of claim 3, wherein the application-independent interface has a capability to interpret the logic execution specification at runtime.

5. A method for a distributed system having a client and a server, comprising:
   interposing a service layer between the client and the server, the service layer having a capability to interpret a usage specification sent as an argument from the client at runtime to enable interaction between the client and the server, wherein the direct interaction between the client and the server is restricted by the service layer;
   invoking a service from the service layer to enable interaction between the client and server; and
   routing correspondence between the client and server through the service layer,
   wherein the usage specification comprises a server object and a plurality of attributes associated with the server object that are requested by the client from the server, and
   wherein the service layer is configured to:
      interpret the usage specification to determine the plurality of attributes to fetch from the server;
      obtain the plurality of attributes from the server; and
      provide the client with the plurality of attributes.

6. The method of claim 5, further comprising:
   the service layer fetching data from the server object based on the usage specification.

7. The method of claim 6, wherein fetching data from the server object comprises storing data fetched from the server in a proxy for the object.

8. The method of claim 5, further comprising the service layer updating data in the server object based on the usage specification.

9. The method of claim 8, wherein updating data in the server object comprises receiving data from the client and using data received from the client to modify the attribute of the server object.

10. The method of claim 5, wherein the service layer is further configured to interpret a logic execution specification comprising logic for invoking a method of the server object.

11. The method of claim 10, wherein interpreting the logic execution specification comprises invoking the method of the server object.

12. A computer-readable medium having recorded thereon instructions executable by a processor, the instructions for:
   interposing a service layer between a client and a server, the service layer configured to interpret a usage specification sent as an argument from the client at runtime to enable interaction between the client and the server, wherein the direct interaction between the client and the server is restricted by the service layer;
   invoking the service from the service layer to enable interaction between the client and server; and
   receiving the usage specification as an argument from the client, wherein the usage specification comprises a server object and a plurality of attributes associated with the server object that are requested by the client from the server; and
   interpreting the usage specification to enable interaction between the client and the server, wherein interpreting the usage specification comprises:
      determining the plurality of attributes to fetch from the server;

obtaining the plurality of attributes from the server; and
providing the client with the plurality of attributes.

13. The computer-readable medium of claim 12, further comprising:
instructions for fetching data from the server object based on the usage specification.

14. The computer-readable medium of claim 12, further comprising:
instructions for updating data in the server object based on the usage specification.

15. The computer-readable medium of claim 12, further comprising instructions for receiving and interpreting a logic execution specification comprising logic for invoking a method of an object on the server.

16. The computer-readable medium of claim 15, wherein interpreting the logic execution specification comprises invoking the method of the object.

17. A distributed system, comprising:
a client component;
a server component having at least one object at runtime; and
interposing a service layer between the client and the server component, the service layer having a capability to interpret a usage specification comprising a plurality of attributes associated with the at least one object, wherein the usage specification is sent as an argument at runtime, and
invoking the service from the service layer to enable interaction between the client component and server component: and
wherein the usage specification comprises a server object and a plurality of attributes associated with the server object that are requested by the client component from the server component;
wherein interpreting the usage specification comprises:
determining the plurality of attributes to fetch from the server component;
obtaining the plurality of attributes from the server component; and
providing the client component with the plurality of attributes.

18. The distributed system of claim 17, wherein the service layer further has a capability of interpreting a logic execution specification in the server component at runtime.

19. A distributed system, comprising:
a service means for providing application-independent services and for interpreting a usage specification and a logic execution specification, wherein the usage specification comprises a server object and a plurality of attributes associated with the server object that are requested by a client component from a server component, wherein the application-independent service is introduced between the client and server components to restrict direct interaction between the client component and the server component and wherein a service from the application-independent service is invoked to enable interaction between the client component and server component; and
the client component configured to send the usage specification and the logic execution specification as an argument to the service means; and
the server component configured to interact with the service means in order to provide services to the client component,
wherein the service means is configured to:
determine the plurality of attributes to fetch from the server component;
obtain the plurality of attributes from the server component; and
provide the client component with the plurality of attributes.

* * * * *